(12) United States Patent
Janke et al.

(10) Patent No.: US 8,136,156 B2
(45) Date of Patent: Mar. 13, 2012

(54) MODULE WITH A CONTROLLER FOR A CHIP CARD

(75) Inventors: Marcus Janke, Munich (DE); Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1059 days.

(21) Appl. No.: 11/863,819

(22) Filed: Sep. 28, 2007

(65) Prior Publication Data

US 2008/0083033 A1 Apr. 3, 2008

(30) Foreign Application Priority Data

Sep. 28, 2006 (DE) .......................... 10 2006 045 906

(51) Int. Cl.
*G06F 21/00* (2006.01)

(52) U.S. Cl. .............. 726/22; 714/13; 711/114; 365/65; 365/222; 702/186

(58) Field of Classification Search ...................... 726/22
See application file for complete search history.

(56) References Cited

U.S. PATENT DOCUMENTS

| | | | | |
|---|---|---|---|---|
| 4,048,481 A * | 9/1977 | Bailey et al. | ..................... | 714/41 |
| 5,515,383 A * | 5/1996 | Katoozi | ..................... | 714/732 |
| 5,787,270 A * | 7/1998 | Bloomer et al. | ............. | 714/6.13 |
| 6,020,755 A * | 2/2000 | Andrews et al. | ................. | 326/39 |
| 6,059,191 A | 5/2000 | Sedlak et al. | | |
| 6,185,507 B1 * | 2/2001 | Huber et al. | ..................... | 702/30 |
| 6,601,228 B1 * | 7/2003 | LaBerge | .......................... | 716/16 |
| 6,622,103 B1 * | 9/2003 | Miller | .............................. | 702/89 |
| 6,775,795 B2 * | 8/2004 | Doll et al. | ...................... | 714/721 |
| 6,975,137 B1 * | 12/2005 | Schadt et al. | .................... | 326/39 |
| 7,044,389 B2 * | 5/2006 | Nishizawa et al. | ........... | 235/492 |
| 7,085,973 B1 * | 8/2006 | Yin | .................................. | 714/718 |
| 2002/0073316 A1 * | 6/2002 | Collins et al. | .................. | 713/174 |
| 2003/0085286 A1 * | 5/2003 | Kelley et al. | .................... | 235/492 |
| 2004/0148461 A1 * | 7/2004 | Steinmetz et al. | ............. | 711/114 |
| 2004/0250181 A1 * | 12/2004 | Vogt et al. | ...................... | 714/718 |
| 2005/0050387 A1 * | 3/2005 | Mariani et al. | ................... | 714/13 |
| 2005/0103839 A1 * | 5/2005 | Hewel | ............................ | 235/380 |
| 2005/0188218 A1 * | 8/2005 | Walmsley et al. | ............. | 713/200 |

(Continued)

FOREIGN PATENT DOCUMENTS

DE 196 10 070 A1 9/1997

(Continued)

OTHER PUBLICATIONS http://www.metatech.com.tw/doc/products-teridian/FDS1121F-V2.3.pdf| EMV Smart-Card Terminal Controller with Built-in Dual ISO-7816 Interface and USB (Nov. 2005|Teridian Semiconductor Company.*

(Continued)

*Primary Examiner* — Taghi Arani
*Assistant Examiner* — Mahfuzur Rahman
(74) *Attorney, Agent, or Firm* — Dickstein Shapiro LLP

(57) ABSTRACT

In a module with a controller for a chip card, the controller having first and second I/O pads for data input and output, and the module having one I/O pad. Both of the first and second I/O pads of the controller are connected to only the one I/O pad of the module. In this manner, data output via one of the first and second I/O pads of the controller may be read and monitored by the controller via the other of the first and second I/O pads of the controller.

5 Claims, 1 Drawing Sheet

U.S. PATENT DOCUMENTS

| | | | |
|---|---|---|---|
| 2005/0190624 A1* | 9/2005 | Kasai | 365/222 |
| 2005/0267845 A1* | 12/2005 | Oh et al. | 705/51 |
| 2006/0080469 A1* | 4/2006 | Coward et al. | 709/250 |
| 2006/0183355 A1* | 8/2006 | Nishizawa et al. | 439/60 |
| 2008/0256415 A1* | 10/2008 | Ostertun et al. | 714/758 |
| 2010/0169636 A1* | 7/2010 | Davis et al. | 713/2 |

FOREIGN PATENT DOCUMENTS

| | | |
|---|---|---|
| DE | 196 34 133 C2 | 2/1998 |
| DE | 103 09 313 A1 | 9/2004 |
| WO | WO-2004/079381 A1 | 9/2004 |

OTHER PUBLICATIONS http://www.metatech.com.hk/datasheet/teridian/pdf/card_reader/73S1121F_PB.pdf|Dual Smart Card Terminal Controller||Aug. 2005| Teridian Semiconductor Company.* http://www.eetimes.com/design/embedded/4006422/Avoid-corruption-in-nonvolatile-memory|Avoid corruption in nonvolatile memory | Christopher Leddy| Aug. 20, 2003 6:00 PM EDT.*

* cited by examiner

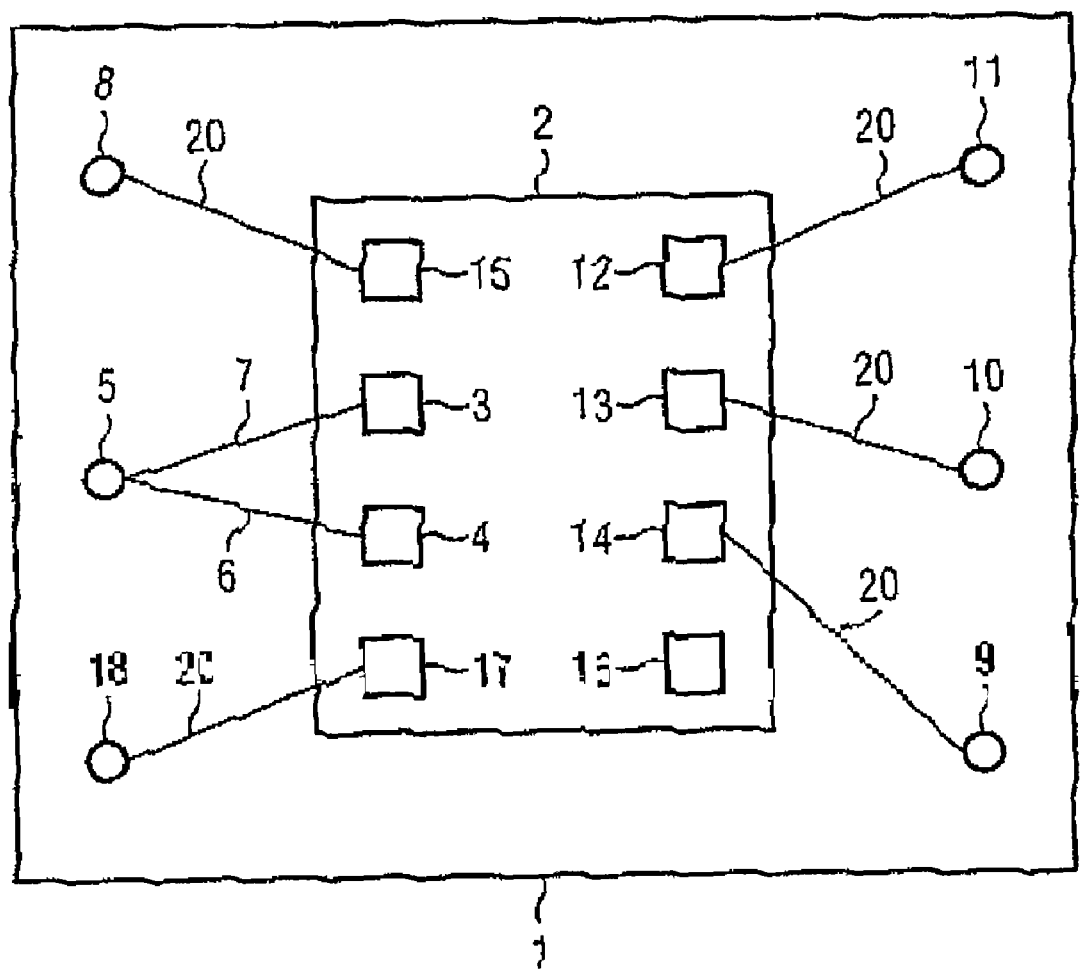

MODULE WITH A CONTROLLER FOR A CHIP CARD

CROSS-REFERENCE TO RELATED APPLICATIONS

This application claims priority from German Patent Application No. 102006045906.7, which was filed on Sep. 28, 2006, and is incorporated herein in its entirety by reference.

TECHNICAL FIELD

The present invention generally relates to a semiconductor device and specifically to a module with a controller for a chip card and to a method for detecting an attack on a controller of a module for a chip card.

BACKGROUND

Chip cards mostly possess eight contact pads, five of which are typically used. They are the electric interface between, for example, a terminal and the controller of the chip card. One of these contact pads is a so-called I/O pad for communicating with external systems. Controllers typically also have at least one I/O pad for communicating with the exterior and are connected to the contact pad of the chip card. On modern safety controllers, there are at least two I/O pads, of which, however, typically only one is connected to the respective pad of the chip-card module. The second I/O port of the controller therefore generally remains unused in the final assembly.

In conventional safety controllers, it is very difficult to check which data actually reaches the exterior from the safety controller via an I/O pad. If the program flow of the safety controller is altered e. g. by an attack from the exterior, confidential data may unnoticeably reach the exterior. As a rule, attempts are made to protect the program flow by appropriate software counter-measures. These software counter-measures, however, provide limited protection only. In addition, a variety of sensors for detecting attacks are known. These detect a large proportion of the attacks, but also do not accomplish actual verification of the correct situation of the data output.

BRIEF DESCRIPTION OF THE DRAWING

Embodiments of the present invention will be detailed subsequently referring to the appended drawing, in which:

FIG. 1 is a principle diagram of an embodiment of an inventive module with a controller for a chip card.

DETAILED DESCRIPTION

An embodiment may have a module with a controller for a chip card, wherein the controller has first and second I/O pads for data input and output, and the module has an I/O pad, and the first and second I/O pads of the controller are connected to only the one I/O pad of the module.

Another embodiment may have a method for detecting attacks on a controller of a module for a chip card, wherein the controller has first and second I/O pads for data input and output, and the module has an I/O pad for data input and output, and wherein the first and second I/O pads of the controller are connected to only the one I/O pad of the module, the method comprising monitoring data transmitted via the first I/O pad of the controller using data received via the second I/O pad of the controller.

One aspect of the present invention is connecting the first and second I/O pads of the controller to only the one I/O pad of the module of the chip card.

By the connection of the first and second I/O pads of the controller with only the one I/O pad of the module, the data transmitted from the first I/O pad may be verified by the controller by means of the second I/O pad.

The controller of the chip card may, in a further embodiment, be a safety controller.

A further embodiment of the module for a chip card involves being configured such that it detects false data or a response time that is too long by means of the controller and, in this case, initiates an alarm.

Further, it can be advantageous if the module of the chip card deactivates itself in a case of an attack or a response time that is too long, thus rendering an attack obsolete.

In a controller with first and second I/O pads for data input and output and a module with a I/O pad, the first and second I/O pads of the controller being connected to only the one I/O pad of the module, the transmitted data of the first I/O pad of the controller is monitored by the controller by means of data received via the second I/O pad of the controller.

A further embodiment of the method involves an alarm being initiated on detection of false data or a response time that is too long.

Furthermore, an embodiment of the present invention, which induces deactivation of the entire chip-card module on detection of false data or a response time that is too long, may be contemplated.

FIG. 1 is a representation of a module 1 with a controller 2 for a chip card according to an embodiment of the invention. On the chip-card controller 2, pads 12, 13, 14, 15, 16, 17, 3, 4 are illustrated, only five pads 12, 13, 15, 3, 4 of which, however, are typically utilized. Two I/O pads 3, 4 are provided for data input and output on the controller 2.

Further pads 5, 8, 9, 10, 11, 18 are illustrated on the module 1. There is a connection of the two controller I/O pads 3, 4 to one I/O pad 5 of the module 1 via two connections 6, 7.

If, for example, data is output between the I/O pad 3 of the controller 2 and the I/O pad 5 of the module 1 via the connection 7, a verification as to whether the correct data is present at the I/O pad 5 of the module 1 may be made by the controller 2 by means of the other connection 6 between the I/O pad 5 of the module 1 and the second I/O pad 4 of the controller 2.

If, vice-versa, data is transmitted between the I/O pad 4 of the controller 2 and the I/O pad 5 of the module 1 via the connection 6, a verification as to whether the correct data is present at the I/O pad 5 may be made by the controller 2 via the other connection 7 between the I/O pad 5 of the module 1 and the second I/O pad 3 of the controller 2. If the controller 2 detects that the data at the I/O pad 5 are not correct, it will deactivate or enter an alarm state.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A chip card module with a controller, wherein the controller comprises a first I/O pad for data input and output and a second I/O pad for data input and output, and the chip card module comprises an I/O pad, and the first and second I/O pads of the controller are connected to the same I/O pad of the chip card module, wherein data transmitted via the first I/O pad of the controller is monitored and verified by the controller by means of the second I/O pad, and wherein the chip card module is adapted to detect false data or a response time that is too long, and to initiate an alarm.

2. The chip card module according to claim 1, wherein the controller is a safety controller.

3. The chip card module according to claim 1, adapted to detect false data or a response time that is too long, and to deactivate the controller.

4. A method for detecting attacks on a controller of a chip card module, wherein the controller comprises a first I/O pad for data input and output and a second I/O pad for data input and output, and the chip card module comprises an I/O pad for data input and output, and wherein the first and second I/O pads of the controller are connected to the same I/O pad of the chip card module, the method comprising monitoring and verifying data transmitted via the controller via the first I/O pad by the controller using data received via the second I/O pad of the controller, wherein an alarm is initiated on detection of false data or a response time that is too long.

5. The method according to claim 4, wherein the controller is deactivated on detection of false data or a response time that is too long.

* * * * *